(12) United States Patent
Nicholes (10) Patent No.: US 7,588,107 B2
(45) Date of Patent: Sep. 15, 2009

(54) SELF PROPELLED TRAILER

(76) Inventor: Ted E. Nicholes, 756 Stringer Rd., Nyssa, OR (US) 97913

( * ) Notice: Subject to any disclaimer, the term of this patent is extended or adjusted under 35 U.S.C. 154(b) by 429 days.

(21) Appl. No.: 11/420,676

(22) Filed: May 26, 2006

(65) Prior Publication Data

US 2007/0272452 A1    Nov. 29, 2007

(51) Int. Cl.
B62D 55/04 (2006.01)
(52) U.S. Cl. ...................... 180/14.2; 180/9.3
(58) Field of Classification Search ............ 180/9.21, 180/9.26, 9.28, 9.3, 19.1; 280/414.1, 414.2, 280/414.3, DIG. 11
See application file for complete search history.

(56) References Cited

U.S. PATENT DOCUMENTS

| | | | |
|---|---|---|---|
| 3,356,172 A | 12/1967 | Peckham et al. | |
| 3,817,401 A | 6/1974 | Becker | |
| 3,861,482 A | 1/1975 | Stephens et al. | |
| 4,096,920 A | 6/1978 | Heyn | |
| 4,106,634 A | 8/1978 | Becker | |
| 4,162,711 A | 7/1979 | Cornelius | |
| 4,860,841 A | 8/1989 | Sacco | |
| 5,325,934 A | 7/1994 | Larson | |
| 5,857,823 A | 1/1999 | MacEachern | |
| 6,170,585 B1 | 1/2001 | Turner | |
| 6,726,235 B2 | 4/2004 | McCarty | |
| 6,758,291 B1 * | 7/2004 | Koch | 180/11 |
| 6,772,997 B2 | 8/2004 | Keaton et al. | |
| 6,779,616 B1 | 8/2004 | Brown | |
| 6,921,304 B2 * | 7/2005 | Hewitt | 440/12.52 |
| 6,991,050 B1 | 1/2006 | Sanford et al. | |
| 7,156,603 B2 * | 1/2007 | Marcotte | 414/339 |
| 2001/0015295 A1 * | 8/2001 | Braun | 180/22 |
| 2002/0104692 A1 * | 8/2002 | Nakatsukasa et al. | 180/8.3 |

* cited by examiner

*Primary Examiner*—Lesley D Morris
*Assistant Examiner*—Jacob Knutson
(74) *Attorney, Agent, or Firm*—Robert L. Shaver; Dykas, Shaver & Nipper (57) ABSTRACT

A self propelled trailer for boats or other loads in which the trailer includes two tracked propulsion units. The propulsion units raise to a position adjacent the frame to allow the trailer to be towed by a towing vehicle, and lower to a position in contact with a road surface to allow the operator to move the trailer and its load without being attached to the towing vehicle. In the case of a load that is a boat, the self propelled trailer and the boat could be driven without an attached vehicle, down a boat loading ramp to launch the boat, and be driven with the boat up the boat loading ramp to rendezvous with a towing vehicle in a parking lot. The propulsion units would then be raised into a position adjacent to the trailer frame and the trailer would be towed on the highway.

20 Claims, 5 Drawing Sheets

SELF PROPELLED TRAILER

FIELD OF THE INVENTION

The present invention generally relates to an apparatus for trailers, and more particularly to self propelled trailers.

BACKGROUND OF THE INVENTION

There are a number of different types of trailers that are used in conjunction with towing vehicles that serve a variety of purposes. These can include trailers for towing boats, for hauling ATVs, for hauling motorcycles, for hauling snowmobiles, utility trailers, and any number of other types of trailers. A common problem with trailers of this type, for instance, boat trailers, comes when the boat is being unloaded. In the example of a boat trailer, the boat trailer may be hauled by a pickup, a pickup with a camper on the bed, or by a recreational vehicle. The typical procedure for launching a boat in such a trailer is to back the trailer down a boat ramp until the trailer is submerged in the water and the boat is able to float free of the trailer. Once the boat is free of the trailer, the towing vehicle can pull the trailer up the launching ramp and the user can park the towing vehicle and the trailer in a parking area.

The difficulty with this procedure is that the towing vehicle may be difficult to use in backing the vehicle down the boat ramp. Visibility may be constrained, and the driver may not be very skilful at backing a trailer. Also, the area of the launching ramp may be crowded and only a narrow slot may be available to back the boat down the ramp. Especially in the case of a large vehicle such as a recreational vehicle, there may not be room to easily back the boat down some ramps, and the whole backing process may be very awkward and constrained.

In any of these situations, an improvement would be if the towing vehicle could unhook the trailer in the parking area, and the trailer could propel itself down the launching ramp to a launch position for the boat, and then propel itself up the launching ramp to the parking area. The reverse would be accomplished when the boat is ready to be taken out of the water. The present invention accomplishes this task with a self propelled boat trailer.

SUMMARY OF THE INVENTION

The present invention is a self propelled trailer for moving a trailer of various kinds independently of a towing vehicle. Such trailers can include a trailer configured for transporting boats, a trailer transporting freight, a trailer for transporting gardening or household materials, a trailer for transporting an automobile, snowmobiles, ATVs, motorcycles, horses, or other trailers of various kinds. The self-propelled trailer of the invention includes a trailer with a trailer frame. The trailer frame has a left and right frame member, and a first and second side member. In the case of a boat trailer, the first side member would be the rear end of the boat trailer and the second side member would be formed by the tongue of the trailer. The left and right hand frame members would be the frame members on the left and right hand side of the boat trailer. Such a trailer would typically have one or more axles attached to the frame, with wheels attached to the axle. The trailer would typically be towed by a towing vehicle to transport from one place to another.

The self propelled trailer of the invention includes one or more propulsion units attached to the trailer frame approximately at the center of gravity of the trailer when loaded with its design load. The placement of the propulsion units would be to place them under the load, so that the propulsion units could have better traction for moving the load. Such placement precludes placing the propulsion units under the tongue of a trailer that has a tongue. A placement at the tongue does not provide sufficient traction to a propulsion unit such as this, especially when moving uphill. The trailer of the invention would also include a steering means. The steering means could take a number of configurations and could be attached to the tongue of a trailer or to a consul on one side of the trailer, and could also be configured for remote operation or for wireless operation. For remote operation a part of the control panel could be moved from the consul itself and extend to a distance to one side of the trailer and be attached by a cable. The control consul could also be totally removable from the consul and be operable by wireless control.

In one configuration of the self propelled trailer of the invention, two propulsion units are provided with one attached to the right frame member and one attached to the left frame member. One embodiment of the invention includes two propulsion units that are track driven units. With the two track driven units, the steering means is to selectively alter the power sent to the left versus the right propulsion unit in order to change direction. This kind of steering is typical for track driven vehicles and provides excellent turning control of a track driven vehicle.

The propulsion units of the invention can be powered by a number of different mechanisms, with a hydraulic drive system being a good one. Other possible driving mechanisms include electric and belt and gear driven, powered a small electric motor. One preferred form of steering controller is a joystick, and other types of steering controls could be utilized such as a steering wheel.

In one embodiment of the invention, the tracked propulsion units are configured to be positioned in either of two positions. One position is a travel position, and in this position the propulsion unit is lifted off the road surface and is placed adjacent to the trailer frame in order to provide clearance during towing of the trailer. The other position of the propulsion unit is the working position, in which a track assembly is lowered into contact with the road surface and held in place against the road surface.

One method of the accomplishing this is to have the propulsion unit made up of a base unit that is mounted to the trailer frame and is attached to a track assembly that pivots from a position adjacent to the base unit to the travel position in which it is in contact with the road surface. The track assembly can pivot using a plurality of pivots that can be driven by hydraulic or mechanical means. In one configuration of the device, the track assembly includes a plurality of torsion road wheels, which support a track that is mounted with a drive wheel at one end and an idler wheel at the opposite end of the track assembly. The drive wheel interacts with the track and causes it to rotate. The idler wheel at the opposite end does not drive the track, but provides tension to the whole track and thus allows the drive wheel to power the track. The torsion road wheels can be spring-loaded or include shock absorber type devices to absorb road shock and keep the track pressed firmly against the road surface.

The trailer of the invention, including the boat trailer, can be formed using a conventional trailer or boat trailer to which are added after market propulsion units and steering controllers in the form of a kit or for after market installation. Such a kit can include a control consul mounted on the frame of the trailer, a remote consul that can be held by the operator to one side of the trailer by utilizing an electric cable, or by use of a wireless controller.

The purpose of the foregoing Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the invention of the application, which is measured by the claims, nor is it intended to be limiting as to the scope of the invention in any way.

Still other features and advantages of the present invention will become readily apparent to those skilled in this art from the following detailed description describing preferred embodiments of the invention, simply by way of illustration of the best mode contemplated by carrying out my invention. As will be realized, the invention is capable of modification in various obvious respects all without departing from the invention. Accordingly, the drawings and description of the preferred embodiments are to be regarded as illustrative in nature, and not as restrictive in nature.

DESCRIPTION OF THE PREFERRED EMBODIMENTS

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

In the following description and in the figures, like elements are identified with like reference numerals. The use of "or" indicates a non-exclusive alternative without limitation unless otherwise noted. The use of "including" means "including, but not limited to," unless otherwise noted.

Figure 1:
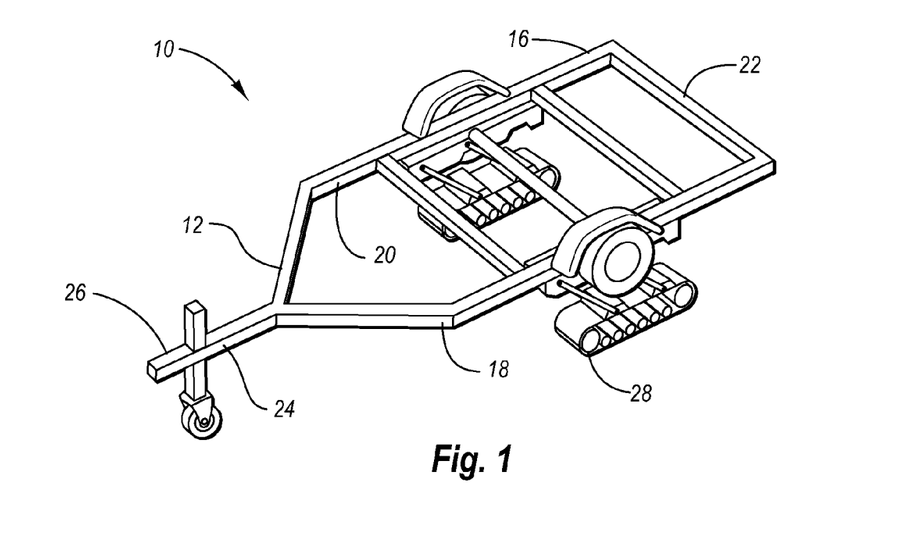
FIG. 1 is a prospective view of the self propelled trailer of the invention.

FIGS. 1-6 show several preferred embodiments of the invention. FIG. 1 shows a self-propelled trailer of the invention, which is designated as 10. Shown in FIG. 1 is a particular configuration of trailer that is configured for hauling a boat. The discussion of the invention will focus on the trailer in a form specifically for towing a boat, but it is to be understood that the invention is directed at the broader concept of self-propelled trailers in a number of different configurations. This can include cargo-hauling trailers that would utilize the propulsion units of the invention to allow them to be maneuvered in a staging area. The concept of the invention also includes use on other trailers such as trailers for hauling a vehicle, trailers for towing the vehicle by lifting only two wheels of the vehicle, trailers for hauling motorcycles, ATVs, snowmobiles, rafts, canoes, and airplanes. It also covers use by trailers hauling any kind of a load, such as pup trailers for hauling bulk material, pup trailers for towing behind semi tractors, flat bed trailers for hauling heavy equipment and trailers for hauling any loads similar to those listed above.

The trailer in FIG. 1 includes a trailer body 12, a trailer frame 16 that includes a left frame member 18 and a right frame member 20. Also included is the first side member 22 and the second side member 24. In the case of a boat trailer, the first side member 22 is the back of the trailer, and the second side member 24 is the tongue 26. Not all trailers will have a tongue, but a boat trailer does. The self propelled trailer 10 shown in FIGS. 1 and 2 also has two propulsion units 28. More details about the propulsion units 28 are shown in other figures.

Figure 2:
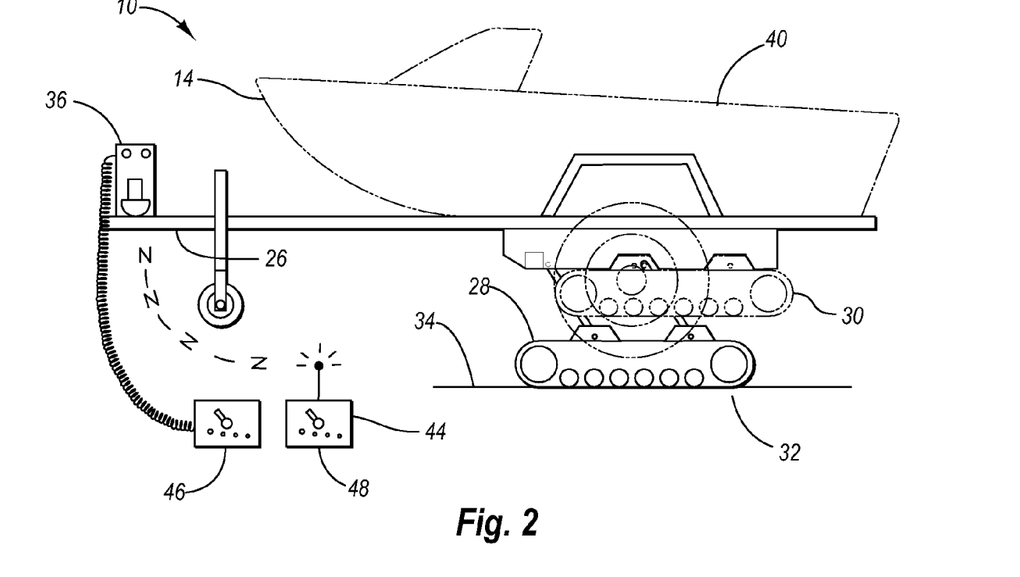
FIG. 2 is a side view of the self propelled trailer of the invention.

FIG. 2 shows in outline the load 14, which in this case is a boat 40. On the tongue 26 of the trailer is located a steering controller 36. The steering controller 36 can be configured for operation from a position mounted on the tongue of the trailer, or it can include a remote controller 46. The remote controller can also be a wireless controller 48. Each of these controllers would preferably utilize a joystick 44, but other control devices are also possible such as individual joysticks, a steering wheel, levers or other systems. The propulsion unit 28 is shown in FIG. 1 as if the left wheel of the trailer were removed. The propulsion unit 28 would operation in addition to the wheel, and would typically be located attached to the axle or frame member of the boat trailer, and located inboard of the wheels. The propulsion unit 28 can operate in two different positions. In FIG. 2, a travel position 30 is shown in outline and the propulsion unit is shown in the working position 32. The propulsion unit moves between these two position depending on if the trailer is to be propelled by the propulsion units, or if it to be towed by a towing vehicle (not shown).

Figure 3:
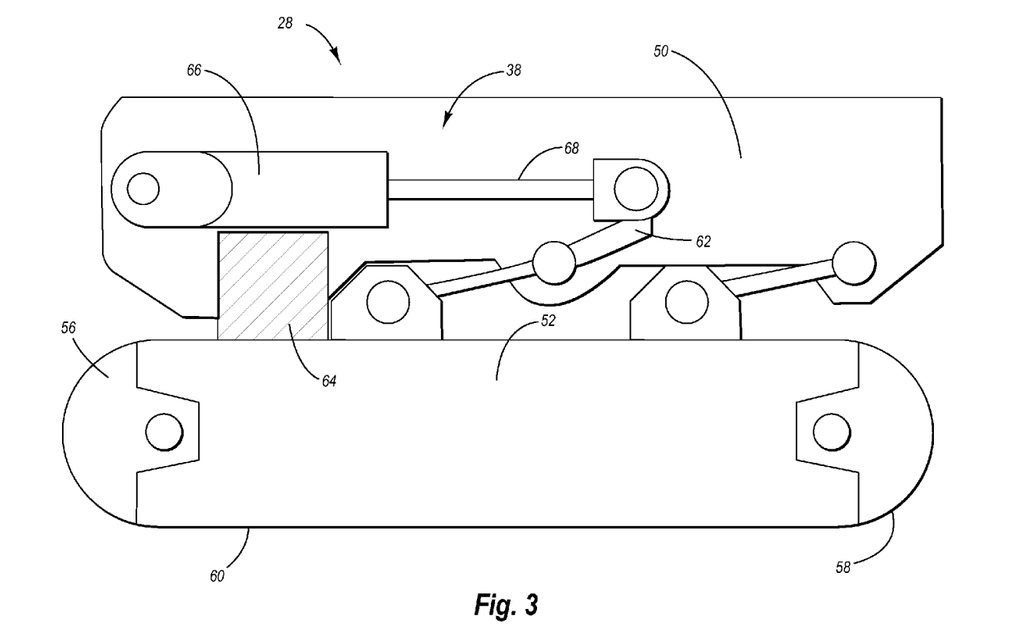
FIG. 3 is a side view of the propulsion unit.
Figure 4:
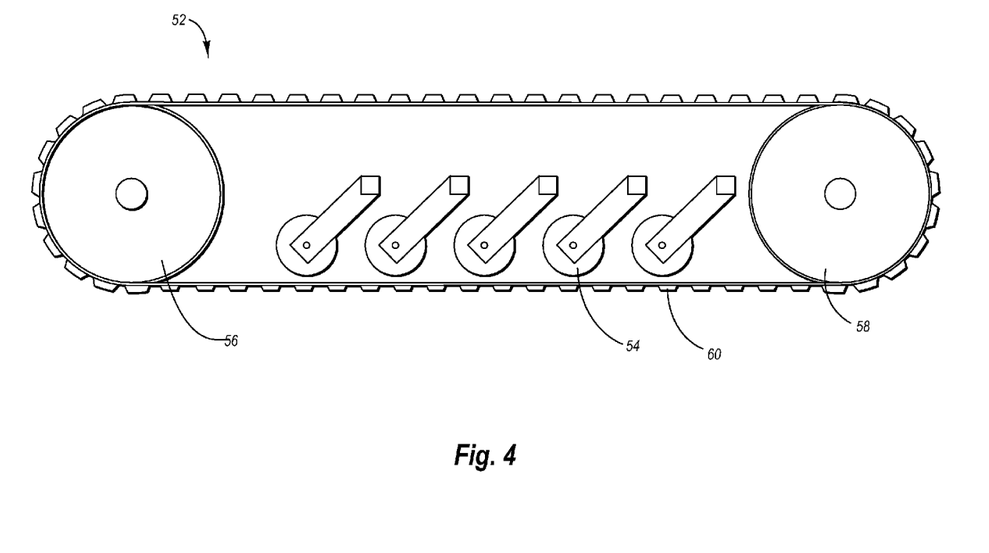
FIG. 4 is a detailed view of the track assembly.

FIG. 3 shows additional details of one version of the propulsion unit 28. This version of the propulsion unit 28 includes a base unit 50 that is attached to the frame or axle 64 of trailer frame 16. Shown in FIG. 3 is a drive wheel 56 and an idler wheel 58. The drive wheel 56 imparts motion to the track 60 and the idler wheel 58 takes up the slack in the track 60. The positions of the drive wheel 56 and the idler wheel 58 can be reversed as the relative position is not critical. Shown in FIG. 3 is a part of the transport system 38. In this version of the transport system 38, a hydraulic cylinder 66 is present which when extended, presses against a pivot arm 62. The pivot arm 62 is anchored to the base unit 50, and also attached to the track assembly 52. When the hydraulic piston 68 moves to the left as shown in FIG. 3, the pivot arm 62 is moved into a more vertical position and the track assembly 52 moves away from the axle 64 and moves away from the base unit 50. This is the working position, and in this position the track assembly 52 engages the road surface 34 and is capable of lifting the wheels of the trailer off the ground and propelling the trailer forward at the direction of the user. FIG. 4 shows some additional detail of the track assembly 52. Shown is a track 60, which is an endless belt that extends between the drive wheel 56 and the idler wheel 58. Between the drive wheel and the idler wheel are located a number of torsion road wheels 54. The torsion road wheels are anchored at one end and urged by spring or by shock absorber mechanisms (not shown) to press against the track 60.

Figure 5:
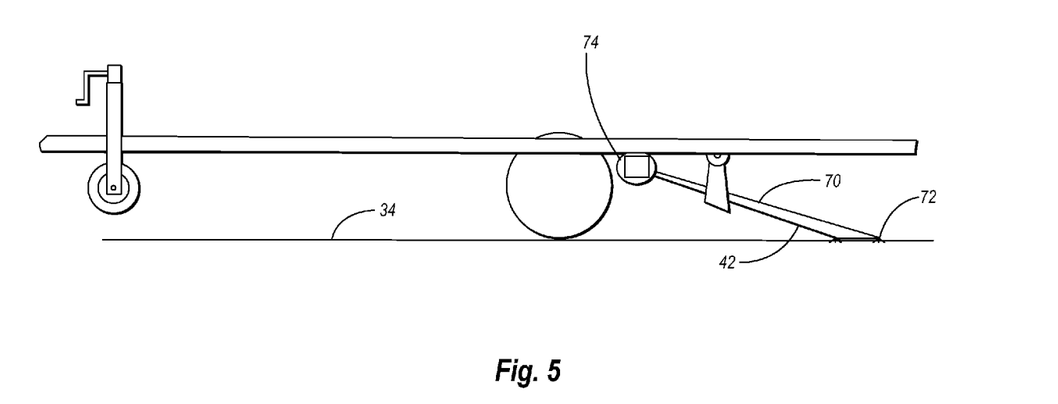
FIG. 5 is a side view of an alternative mode of propulsion.
Figure 6:
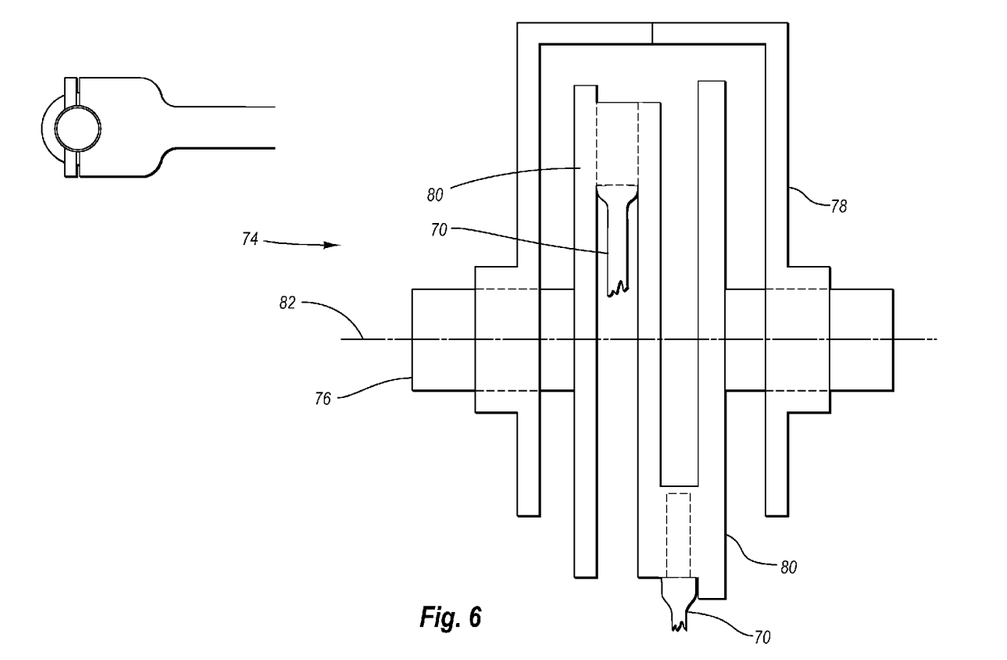
FIG. 6 is a cross sectional detailed view of the rotary driver.

FIG. 5 shows an alternative form of propulsion that would typically be used as a supplement to the track driven propulsion unit 28. This propulsion unit is a pushing foot 42, which is shown in an extended and retracted position. The pushing foot 42 includes a pushing rod 70 and ground contact foot 72. At the first end of the pushing rod, which is opposite of the ground contact foot, the pushing rod is attached to a rotary driver 74. Shown in FIG. 6, the rotary driver 74 includes a driver axle 76 and a driver body 78. Within the driver body 78, are eccentric rod attachments 80 that are attached to the driver axle 76. As the driver axle 76 rotates, the eccentric rod attachments 80 also rotate around the long axis 82 of the driver axle 76. The eccentric rod attachments can be in the form of round disks, or they can also be a rod or plate extending away from the driver axle 76. As the driver axle 76 rotates, the eccentric rod attachments 80 also rotate and this rotary motion is converted into a linear motion of the pushing rods 70. Thus, the pushing rod 70 would move to an extended position and then be retracted into a non-extended position. If the ground contact feet 72 are lowered so that they can contact the ground, this extension and retraction of the pushing rods would propel the trailer forward. This supplemental propulsion would be provided so that in certain situations in which the track propulsion units did not have enough traction to propel the trailer, the pushing foot 42 could provide additional propulsion to get over a slippery spot in the road surface 34.

While there is shown and described the present preferred embodiment of the invention, it is to be distinctly understood that this invention is not limited thereto, but may be variously embodied to practice within the scope of the following claims. From the foregoing description, it will be apparent that various changes may be made without departing from the spirit and scope of the invention as defined by the following claims.

What is claimed is:

1. A self propelled trailer for moving independently of a towing vehicle, comprising:
   a trailer body for supporting, transporting and launching a load, said trailer comprising a frame with a left and a right frame members and a first and second side members;
   one or more tracked propulsion units mounted to said trailer frame approximately at the center of gravity of the trailer when loaded with said load;
   a steering means; and
   wherein said tracked propulsion units are configured to move from a travel position to a working position, wherein said tracked propulsion units are positioned beneath of said trailer body when in said travel position, when in said working position, and when traveling between said travel position and said working position, with said travel position providing road clearance for towing of said trailer by a vehicle, and with said working position one in which said one or more propulsion units contacts a road surface and is configured to propel said trailer without being towed by said towing vehicle.

2. The trailer of claim 1 wherein the one or more propulsion units comprise two propulsion units, one on the right and one on the left frame member.

3. The trailer of claim 2 in which said propulsion units are driven tracks and the steering means is to alter power to the propulsion units to change direction.

4. The trailer of claim 1 in which said one or more propulsion units move between the travel and the working position by a hydraulic transport system.

5. The trailer of claim 1 in which said trailer frame is configured for transporting a boat.

6. A self propelled boat trailer for moving independently of a towing vehicle, comprising:
   a frame with a left and a right frame members and a first and second side member in the form of a trailer rear and a trailer tongue, wherein said frame is configured for supporting, transporting and launching a boat;
   a pair of tracked propulsion units mounted to said trailer frame approximately at the center of gravity of the trailer when loaded with said boat, in which steering is accomplished by selectively powering one or the other of the propulsion units to change direction;
   a steering controller for selectively powering said propulsion units; and
   with said tracked propulsion units movable from a travel position to a working position, with said travel position providing road clearance for towing of said boat trailer by a vehicle, and with said working position one in which said tracked propulsion units contact a road surface and is configured to propel said boat trailer when loaded with said boat independent of said towing vehicle, wherein said tracked propulsion units are positioned beneath said trailer frame when in said travel position, when in said working position, and when traveling between said travel position and said working position.

7. The boat trailer of claim 6 in which said tracked propulsion units move between the travel and the working position by a hydraulic transport system.

8. The boat trailer of claim 6 further comprises a second propulsion device in the form of a pushing foot, and a system for extending and retracting said pushing foot from said boat trailer frame, to propel said boat trailer by alternatively extending said pushing foot into pushing contact with the road surface, and retracting said pushing foot toward said boat trailer frame.

9. The boat trailer of claim 6 in which said steering controller is a joystick which selectively powers the two tracked propulsion units to change direction of travel of the trailer.

10. The boat trailer of claim 6 in which said steering controller is operable from a position remote from said boat trailer.

11. The boat trailer of claim 10 in which said steering controller is operable from a position remote from said boat trailer by a wireless controller.

12. The boat trailer of claim 6 in which said propulsion units include a base unit mounted to said boat trailer frame, from which a track assembly pivots to a travel position adjacent to said base unit or to a working position separated from said base unit.

13. The boat trailer of claim 12 in which said propulsion units further comprises a plurality of pivot arms, mounted to said base unit and to said track assemblies, with said pivot arms approaching vertical when extended into said working position, and approaching horizontal when moved into said travel position, with said track assembly moved into a position adjacent to said base unit when moved into said travel position, and moved to a position separate from said base unit when moved to said working position.

14. The boat trailer of claim 12 in which said tracked propulsion units include a plurality of torsion road wheels supporting a track between a drive wheel and an idler wheel at opposite ends of said track assembly.

15. A self propelled boat trailer for moving independently of a towing vehicle, comprising:
   a frame configured for supporting, transporting and launching a boat, said frame comprising a left and a right frame members and a first and second side member in the form of a trailer rear and a trailer tongue;
   a pair of tracked propulsion units configured for after market mounting to said trailer frame approximately at the center of gravity of the trailer when loaded with said boat, in which steering is accomplished by selectively powering one or the other of the tracked propulsion units to change direction;
   a joystick steering controller for selectively powering said propulsion units; and with said propulsion units movable from a travel position to a working position, wherein said pair of tracked propulsion units are configured to be mounted to said trailer frame such that said tracked propulsion units are positioned beneath said frame in both said travel position and said working position, with said travel position providing road clearance for towing of said boat trailer by a vehicle, and with said working position one in which said tracked propulsion units contact a road surface and is configured to propel said boat trailer when loaded with a boat independent of said towing vehicle.

16. The boat trailer of claim 15 in which said tracked propulsion units move between the travel and the working position by a hydraulic transport system.

17. The boat trailer of claim 15 in which said steering controller is operable from a position remote from said boat trailer.

18. The boat trailer of claim 15 in which said propulsion units include a base unit mounted to said boat trailer frame, from which a track assembly pivots to a travel position adjacent to said base unit or to a working position separated from said base unit.

19. The boat trailer of claim 18 in which said propulsion units further comprise a plurality of pivot arms, mounted to said base unit and to said track assemblies, with said pivot arms approaching vertical when extended into said working position, and approaching horizontal when moved into said travel position, with said track assembly moved into a position adjacent to said base unit when moved into said travel position, and moved to a position separate from said base unit when moved to said working position.

20. The boat trailer of claim 18 in which said tracked propulsion units include a plurality of torsion road wheels supporting a track between a drive wheel and an idler wheel at opposite ends of said track assembly.

* * * * *

UNITED STATES PATENT AND TRADEMARK OFFICE
CERTIFICATE OF CORRECTION

PATENT NO. : 7,588,107 B2 Page 1 of 1
APPLICATION NO. : 11/420676
DATED : September 15, 2009
INVENTOR(S) : Ted E. Nicholes It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 541 days.

Signed and Sealed this

Twenty-first Day of September, 2010

David J. Kappos
*Director of the United States Patent and Trademark Office*